United States Patent
Petrek (12)

(10) Patent No.: US 6,286,678 B1
(45) Date of Patent: *Sep. 11, 2001

(54) REFILL PACK FOR PIPETTE TIP RACKS AND IMPROVED PIPETTE TIP SUPPORT PLATE FOR USE IN SUCH PACKS AND RACKS

(75) Inventor: James S. Petrek, Danville, CA (US)

(73) Assignee: Rainin Instruments Co., Inc., Emeryville, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/263,133

(22) Filed: Mar. 5, 1999

(51) Int. Cl.[7] ............................. B65D 85/20; B65D 21/00
(52) U.S. Cl. ......................... 206/443; 206/499; 206/486; 206/562; 422/100; 422/104
(58) Field of Search ................................... 206/443, 499, 206/486, 560, 562; 422/100, 102, 104; 211/60.1, 74

(56) References Cited

U.S. PATENT DOCUMENTS

| Re. 34,133 | * | 11/1992 | Thorne | 422/104 |
|---|---|---|---|---|
| 4,928,934 | * | 5/1990 | Morton, Jr. | 206/560 |
| 5,392,914 | * | 2/1995 | Lemieux et al. | 206/486 |
| 5,603,899 | * | 2/1997 | Franciskovich et al. | 422/104 |
| 5,628,400 | * | 5/1997 | Feder | 206/443 |
| 5,779,057 | * | 7/1998 | LePage et al. | 206/486 |
| 5,779,984 | * | 7/1998 | Kelly et al. | 206/486 |

* cited by examiner

Primary Examiner—Luan K. Bui
(74) Attorney, Agent, or Firm—Robert R. Meads

(57) ABSTRACT

A refill pack of light weight low mass material containing an array of replacement pipette tips for a reusable tip rack. The refill pack comprises a support plate with an array of holes containing pipette tips arranged in an organized manner and including a guide for centering and guiding the support plate onto the tip rack with distal end portions of the pipette tips aligned with corresponding holes in an organizing tray in the tip rack, the support plate including vertically extending lateral support means adjacent at least some of the holes in the plate to engage sides of the pipette tips to laterally support such tips against lateral rocking on the plate.

9 Claims, 5 Drawing Sheets

REFILL PACK FOR PIPETTE TIP RACKS AND IMPROVED PIPETTE TIP SUPPORT PLATE FOR USE IN SUCH PACKS AND RACKS

FIELD OF INVENTION

The present invention relates to environmentally protective disposable refill packs of pipette tips for reusable pipette tip racks and to an improved pipette tip support plate for use in such packs and racks.

BACKGROUND OF THE INVENTION

It is the function of pipette tip racks to organize disposable pipette tips in a manner for convenient tip placement on a pipette. Such racks generally comprise a rigid base with vertical sides joined at contiguous edges and horizontally supporting a rigid pipette tip organizing tray having an array of pipette tip receiving holes extending there through. The pipette tips are organized and held vertically in the array of holes for ease of access by a pipette tip user. In this regard, the pipette tip user simply places a hand-holdable pipette over the rack and lowers a distal end of the pipette into a proximal or upper end of a vertically oriented pipette tip and presses down to affix the tip to the pipette. A similar operation is followed by the user when connecting a plurality of tips to a multiple tip pipette. U.S. Pat. No. 4,676,377 describes a conventional pipette tip rack of the type just described and U.S. Pat. No. 4,779,467 describes a multiple tip pipette.

Once all tips are dispensed from the tip rack, the rack may be discarded or reloaded with a new supply of pipette tips. The reloading of replacement pipette tips into the tip rack in a rapid, convenient manner is important to pipette users. In this regard, any packaging containing pipette tips for use in reloading pipette tips into a tip rack should arrange the pipette tips in a manner to accommodate direct dispensing of the tips into the array of holes in the organizing tray of the tip rack. Further, the packaging should guide and assist in centering the replacement pipette tips over the rack with the array of replacement tips aligned with the array of holes in the pipette tip rack organizing tray upon a lowering of the packaging onto the rack. Moreover, it is important that such packaging protect the replacement pipette tips from damage and contamination during shipping, handling and storage and provide for sterilization of the replacement tips by autoclaving or irradiation. Still further, when plastic materials are utilized for such packaging, it is particularly important to the preservation of our environment that (1) the plastic material be recyclable to the extent possible and (2) the packaging structure be thin, lightweight and of low mass to minimize the amount of non-biodegradable disposable material from such packaging. Furthermore, there is a need for refill packs for manually reloading reusable pipette tip racks with filter containing pipette tips such as the FilterPro of the Rainin Instrument Co., Inc., assignee of the present invention.

U. S. Pat. No. 5,392,914 assigned to the assignee of the present invention, describes pipette tip packaging systems and refill packs for pipette tip racks for loading new supplies of pipette tips into reusable tip racks and is incorporated herein by this reference. With one packaging system described in the patent, a technician grasps and positions a tubular cover containing a stack of support plates each containing an array of replacement pipette tips and centers the cover over an empty pipette tip rack. With distal ends of the tips in a lowermost one of the support plates extending into empty holes in the support tray of the pipette tip rack, the technician presses downward on a top or push plate in the tubular cover to push the stack of support plates downwardly within the cover effecting a release of the lowermost support plate and the array of tips supported thereby into the empty holes in the support tray of the tip rack. With another packaging system described in the patent, the technician places a refill pack over the top of the reusable tip rack and simply presses down on the top of the pack to release a support plate containing an array of replacement pipette tips into the empty tip rack. Then, when the technician desires to attach a pipette tip to a pipette, he follows the previously described method of placing a hand holdable pipette over the rack, lowering a distal end thereof into an upper end of a vertically oriented pipette tip and pressing down to affix the tip to the pipette.

The above described packaging systems and pipette tip rack refill packs have heretofore performed very well in the housing of replacement pipette tips and in the refill of empty pipette tip racks. However, with the recent advent of "micro"-size pipette tips having liquid intake volumes of about 10 microliters, it has been found that the pipette tip support plates included in the present versions of the packaging systems and refill packs do not provide adequate support for the proximal end portions of such "micro" tips against lateral rocking and displacement during shipping and use of the refill packs. This is primarily due to the narrow nature of the distal end portions of such tips and the relative low mass thereof compared to the upper or proximal ends of such tips. In essence, such micro pipette tips are "top heavy" and have a tendency to laterally rock on conventional support plates interfering with the efficient dispensing of the micro pipette tips as replacement tips into an empty pipette tip rack. Such a tendency to laterally rock in conventional refill pack support plates and in conventional tip rack support trays is also a characteristic of other top heavy pipette tips. Also, pipette tips having a taper angle in the region passing through the holes in conventional support plates and tip rack support trays sufficient to leave a clearance space between the tip and the support hole (large taper angle tips), have a tendency to rock laterally on the support plates and trays with resulting misalignment of the tips particularly when such tips are vertically displaced as during shipment and handling of refill packs and tip rack containing such tips.

U.S. Pat. No. 5,487,997 describes a pipette tip rack refill pack which includes a support plate having tapered holes for engaging and gripping vertically extending ribs on the proximal end portion of pipette tips as the ribs extend through the plate. Such friction gripping of the tips holds them securely within the pack and prevents lateral rocking of the tips while they are secured in the support plate. In use, however, the pack is intended to be placed over an empty tip rack with distal ends of the tips inserted into the holes in a support tray of the tip rack until the lower ends of the vertical ribs rest on a top of the support tray. In this position, the support plate is vertically spaced from the top of the support tray. To release the tips for dispensing from the tip rack, the support plate is forced downwardly to rest on top of the support tray. The tips are no longer laterally supported by the support plate and are free to rock laterally if they are micro or other top heavy pipette tips or large taper tips as previously defined.

Thus, there is a need for improved pipette tip packaging and refill packs which impart lateral stability to micro as well as other small volume pipette tips contained therein. The present invention satisfies such a need.

SUMMARY OF THE INVENTION

In its most basic form, the present invention provides a simple, low cost and disposable or recyclable refill pack for reusable pipette tip racks in which pipette tips are contained with their longitudinal axes vertically positioned in a horizontally spaced pattern or array. The refill pack comprises one or more semi-rigid horizontal pipette tip organizing and support plates each having an array of holes for vertically receiving and organizing pipette tips in a desired pattern for deposit into and containment within the organizing tray of an empty tip rack. Distal end portions of pipette tips extend vertically through the holes on one side of each support plate while proximal end portions of the pipette tips are supported on an opposite side thereof. A hand-gripable refill pack positioning and guide structure of light-weight, low mass material extends from the support plate or plates and comprises a guide extending downwardly from the support plates beyond the distal end portions of the pipette tips to provide protection therefore. The guide is open at its bottom and dimensioned to closely receive a top of the tip rack with inner sides of the guide engaging outer edges of the tip rack to center the refill pack over the tip rack and to guide the distal end portions of the pipette tips into the holes in the organizing tray of the tip rack for vertical support as the support plate carrying the pipette tips is lowered onto the tray to complete a refilling of the tip rack. Preferably the support plates or at least a lowermost one of the support plates is releasably secured to a light weight flexible hand-gripable positioning structure which when connected thereto guides and centers the support plate over and into an open top of an empty tip rack with distal end portions of the pipette tips carried by the support plate extending vertically into the array of holes in the organizing tray of the tip rack for support thereby upon a release of the positioning structure from the support plate.

In order to provide the desired lateral stability for "micro" and other top heavy and large taper angle pipette tips in the refill pack of the present invention as well as in the pipette tip rack after it has been refilled with such pipette tips, the present invention provides one or more improved pipette tip support plates specially designed to receive and laterally support "micro" as well as other top heavy and large taper pipette tips. The improved support plates are useful in refill packs and in tip racks and each comprise a plate of rigid or semi-rigid plastic material having an array of holes therein for receiving the distal end portions of a plurality of micro and other top heavy and large taper pipette tips. Adjacent each pipette tip receiving hole in the improved tip support plate is lateral support means for the tip confined in the associated support hole. Each such lateral support means comprises one or more vertically extending support surfaces. The support surfaces are shaped and dimensioned to engage a side of the tip supported in the associated hole should the tip rock laterally in the hole thereby maintaining the vertical alignment of the tip in the hole. The support surfaces may take various forms including projections from the support plate comprising (i) a plurality of posts or arcuate sections spaced circumferentially around each tip receiving hole or (ii) vertically extending enclosures around each such hole such as a rectilinear grid of vertically extending cross members or preferably a vertically extending collar surrounding each hole and dimensioned to receive and provide a lateral support for the vertically extending proximal end portion of each micro or other top heavy or large taper pipette tip supported by the support plate. Alternatively, the lateral support may be provided by a annular shoulder formed by a stepped side wall in each pipette tip receiving hole. With the use of such new support plates, the improved refill pack of the present invention maintains the micro and other top heavy and large taper pipette tips in vertical alignment laterally spaced from each other for efficient dispensing into empty pipette tip racks. Since the lowermost support plate is dispensed with the lowermost array of pipette tips from the open bottom of the improved refill pack of the present invention, the improved support plate continues to provide the desired lateral support for the micro and other top heavy and large taper pipette tips in the refilled pipette tip rack.

DESCRIPTION OF THE PREFERRED EMBODIMENTS

The present invention provides a novel refill pack of disposable pipette tips for reusable pipette tip racks and may take any of a multiplicity of forms within the claims hereafter presented.

Figure 1:
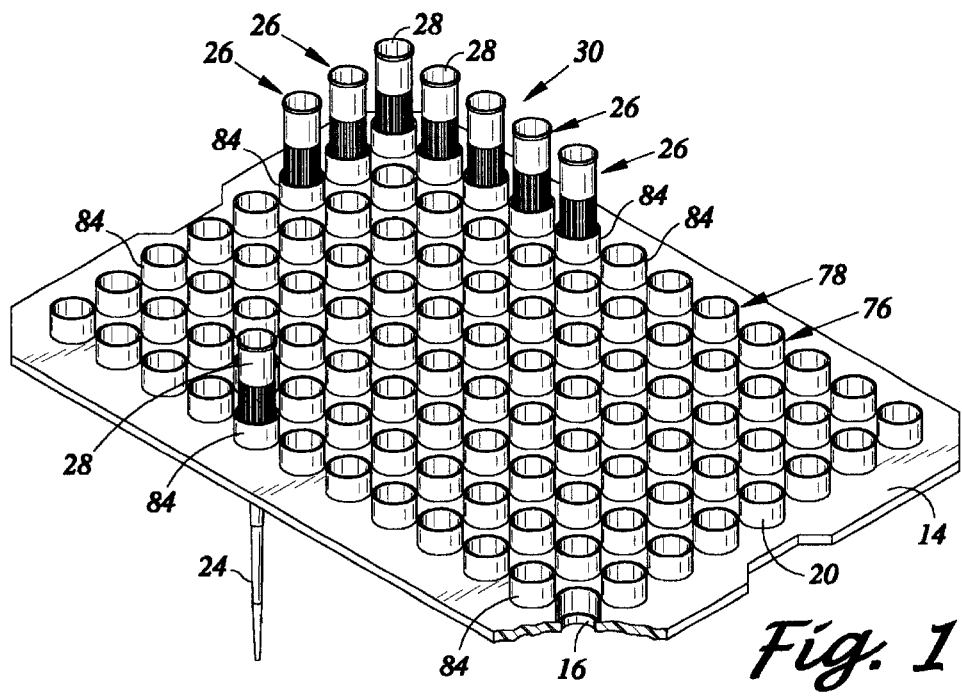
FIG. 1 is an enlarged prospective view of a preferred embodiment of the improved pipette tip support plate according to the present invention depicting the plate as including an array of through holes which for clarity of illustration are only partially filed with an array of pipette tips. The illustrated version of pipette tip support plate includes lateral support means adjacent each tip receiving hole preferably comprising a vertically extending collar around each hole in the support plate for receiving a pipette tip and for supporting the tip vertically within its associated hole during transport in a refill pack and during dispensing from the pack into an empty pipette tip rack.
Figure 1A:
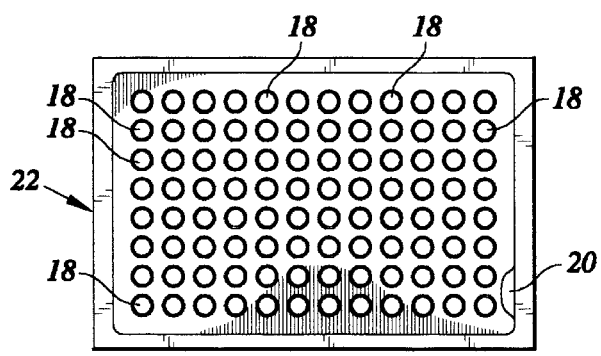
FIG. 1A is a top view of a typical pipette tip rack showing a pipette tip support tray including an array of through holes matching in number and location the array of holes in the support plate shown in FIG. 1.
Figure 2A:
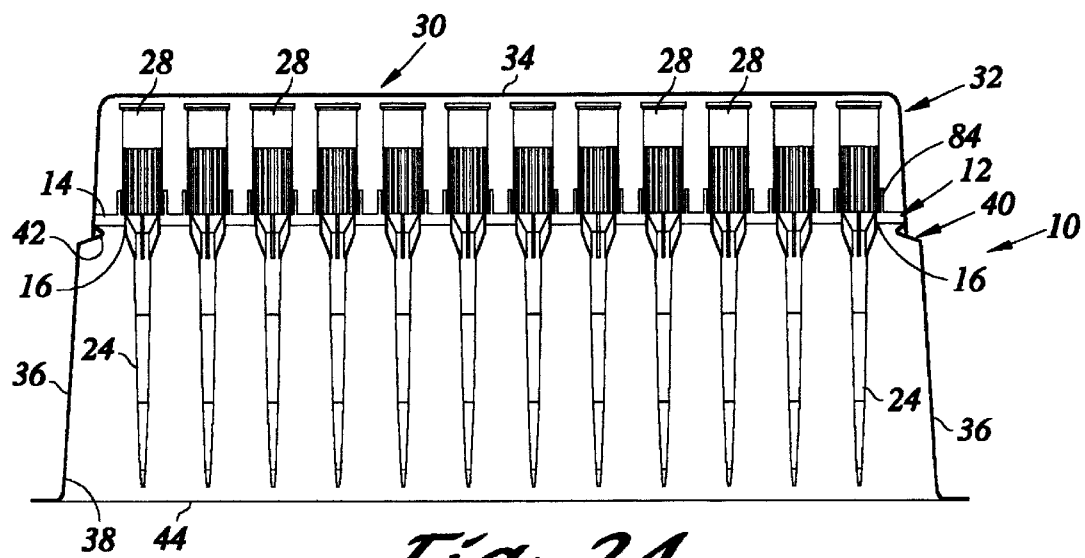
FIG. 2A is a sectional side view of a thin-wall lightweight single array pipette tip refill pack according to the present invention with extended sides forming (i) releasable means for retaining a pipette tip organizing and support plate and (ii) a guide for positioning and centering the organizing plate and an array of pipette tips supported thereby over a tip rack.
Figure 2B:
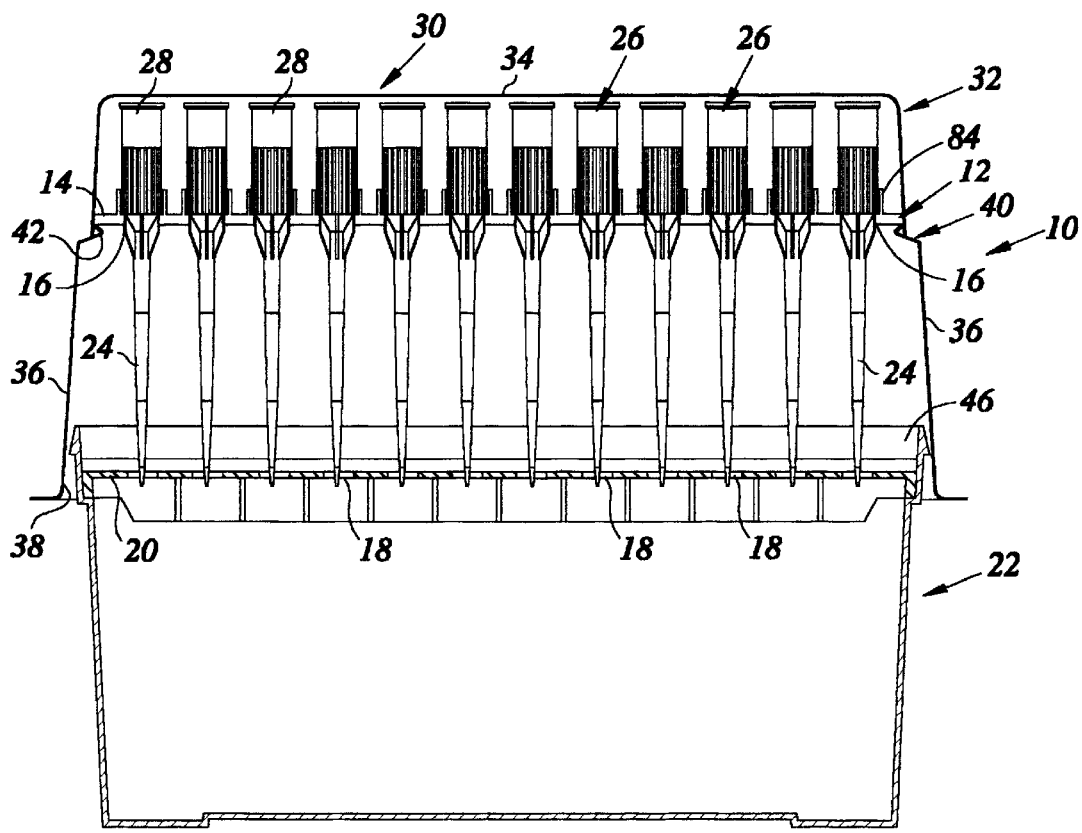
FIG. 2B is a side view similar to FIG. 2A further showing a typical pipette tip rack with the sides of the refill pack guiding the pack onto the rack with distal ends of the pipette tips vertically aligned with and entering an array of holes in a horizontal organizing and support tray included in the tip rack.
Figure 2C:
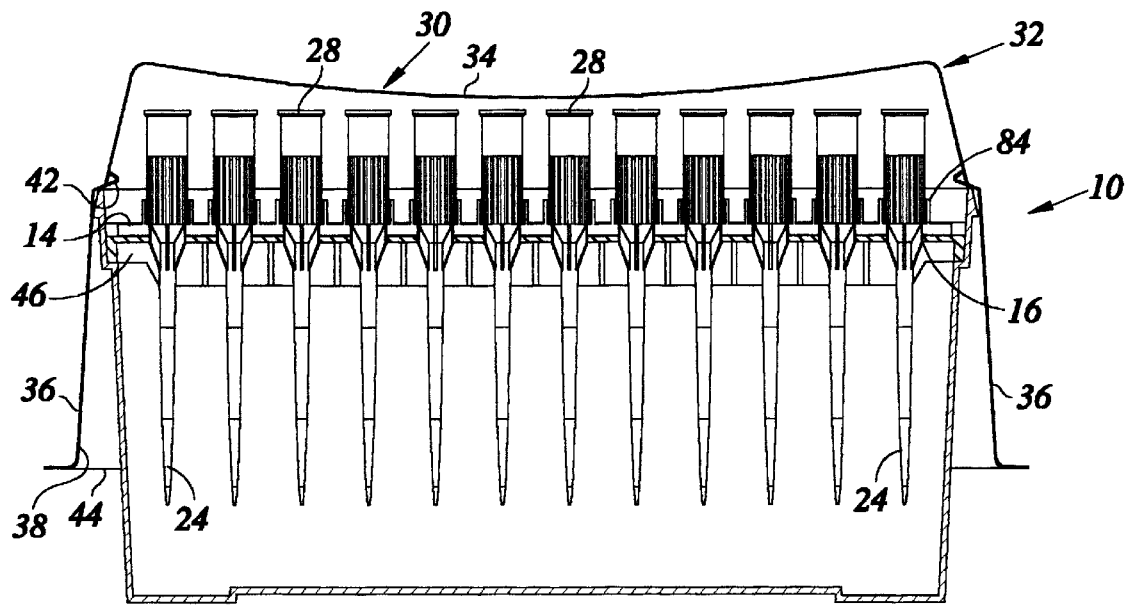
FIG. 2C is a side view similar to FIG. 2B illustrating a release of the pipette tips from the refill pack into the reusable tip rack.

FIGS. 2A through 2C depict a preferred single pipette tip array refill pack 10 according to the present invention. As shown, a support structure 12 of the refill pack 10 comprises a separate, semi-rigid or flexible plastic, horizontally oriented rectangular support plate 14 having a rectilinear array of holes 16 extending therethrough. A preferred embodiment of the support plate 14 is shown in FIG. 1 which clearly shows the array of holes 16 supporting an array of pipette tips 26. The array of holes 16 in the support plate 14 corresponds dimensionally and spatially to the array of holes 18 in a typical pipette tip organizing and support tray 20 for a typical pipette tip rack 22, a top view of which is depicted in FIG. 1A.

As illustrated in FIGS. 1, 2A and 2B, each hole 16 in the support plate 14 is dimensioned to just receive the relatively narrow and tapered distal end portion 24 of a pipette tip 26 with its longitudinal axis vertically oriented. The larger proximal end portion 28 of each pipette tip 26 will not fit through its associated hole 16 such that the proximal end portion extends vertically from the support plate 14 on a side opposite the distal end. In this manner, the support plate 14 supports the pipette tips 26 in an array 30 with the distal end portions 24 extending vertically through the holes 16 and the proximal end portions 28 extending vertically from an opposite side of the support plate for protection by a cover 32.

Figure 2D:
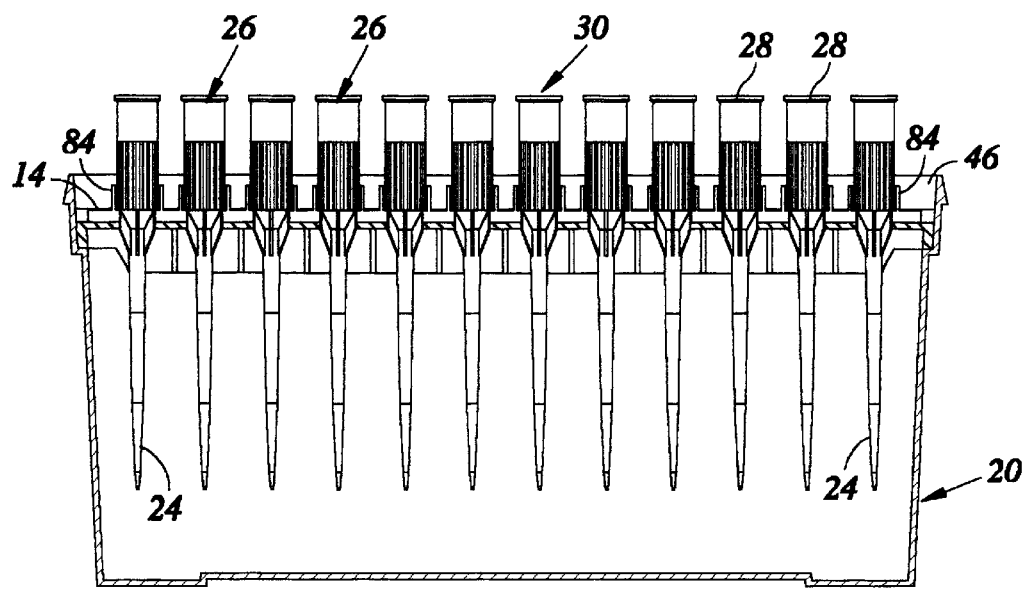
FIG. 2D is a side view of the tip rack of FIGS. 2B and 2C refilled with the array of pipette tips.

In the embodiment of FIG. 2A, the cover 32 functions as a carrier for the support plate 14 and the array of pipette tips 16. As shown the cover 32 is generally dome-shaped and preferably formed of a thin, light weight flexible plastic material. In this regard, the cover 32 is formed with a horizontally extending, downward or inwardly flexible top 34 and with contiguous, outwardly flexible side members 36 extending vertically downward and slightly outward from a marginal edge of the top 34 to form the open bottom skirt 38. In addition, the cover 32 includes manually releasable means 40 for releasably securing the support plate 14 horizontally within the cover with the proximal end portions 28 of the pipette tips adjacent the inwardly flexible top 34 and with lower ends of the side members 36 extending beyond the ends of the distal end portions 24 of the tips 26 to enclose and protect the tips. Preferably, the releasable means 40 is formed in the side members 36 and comprises vertically positioned, inwardly extending horizontal protrusions 42 for releasably supporting and retaining the support plate 14 within the cover 32. The protrusions 42 are spaced from an open bottom 44 of the skirt 38 such that the proximal end portions 28 are captured in a chamber between the top 34 and the support plate 14 and the distal end portions 24 are confined by the skirt 38 which extends downwardly beyond the distal ends to provide protection therefore. As represented in FIGS. 2B and 2C, the skirt 38 is dimensioned relative to the tip rack 22 so as to position and center the support plate 14 over an open top 46 of the tip rack as the skirt is lowered onto the rack. Preferably, during such lowering of the skirt, the side members 36 engage and ride downwardly on outer surfaces of the side support members of the tip rack 22 as shown in FIG. 2C. Further, as depicted in FIGS. 2B and 2C, the guiding and centering provided by the skirt 38 aligns the distal end portions 24 of the pipette tips 26 with the holes 18 in the organizing tray 20 of the tip rack such that upon a lowering of the skirt, lower ends of the distal end portions of the tips 26 vertically enter the holes 18. With the skirt thus positioned, the user presses downward on the top 34 of the cover 32 to inwardly flex the top and outwardly flex the side members 36 as shown in FIG. 2C. With such outward flexing of the side members 36, the support plate 14 is released by the releasable means 40 to fall downwardly through the open bottom of the skirt onto the organizing tray 20 for support thereby with the array of pipette tips supported by the support plate being seated in the holes 18 in the tray 20. The cover 32 then is removed leaving the reloaded tip rack as depicted in FIG. 2D.

From the foregoing, it is appreciated that the preferred basic form of the present invention possess all of the previously discussed desirable structural and function features of a refill pack for reloading empty reusable tip racks. In particular, the refill pack is easy to use and automatically positions an array of replacement pipette tips in the tip rack. Further, the refill pack depends on the tip rack for structural strength during subsequent loading of pipette tips onto single and multiple-tip pipettes. Furthermore, the refill pack is formed of light weight, semi-rigid or flexible, low mass plastic materials presenting a minimum of disposable waste.

Figure 4:
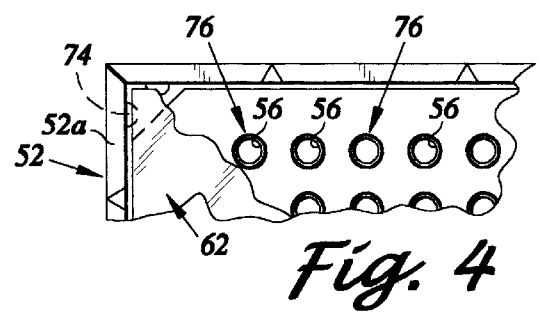
FIG. 4 is a top view partially cut away of a corner of a push plate and support plate in the embodiment of FIG. 3.
Figure 3:
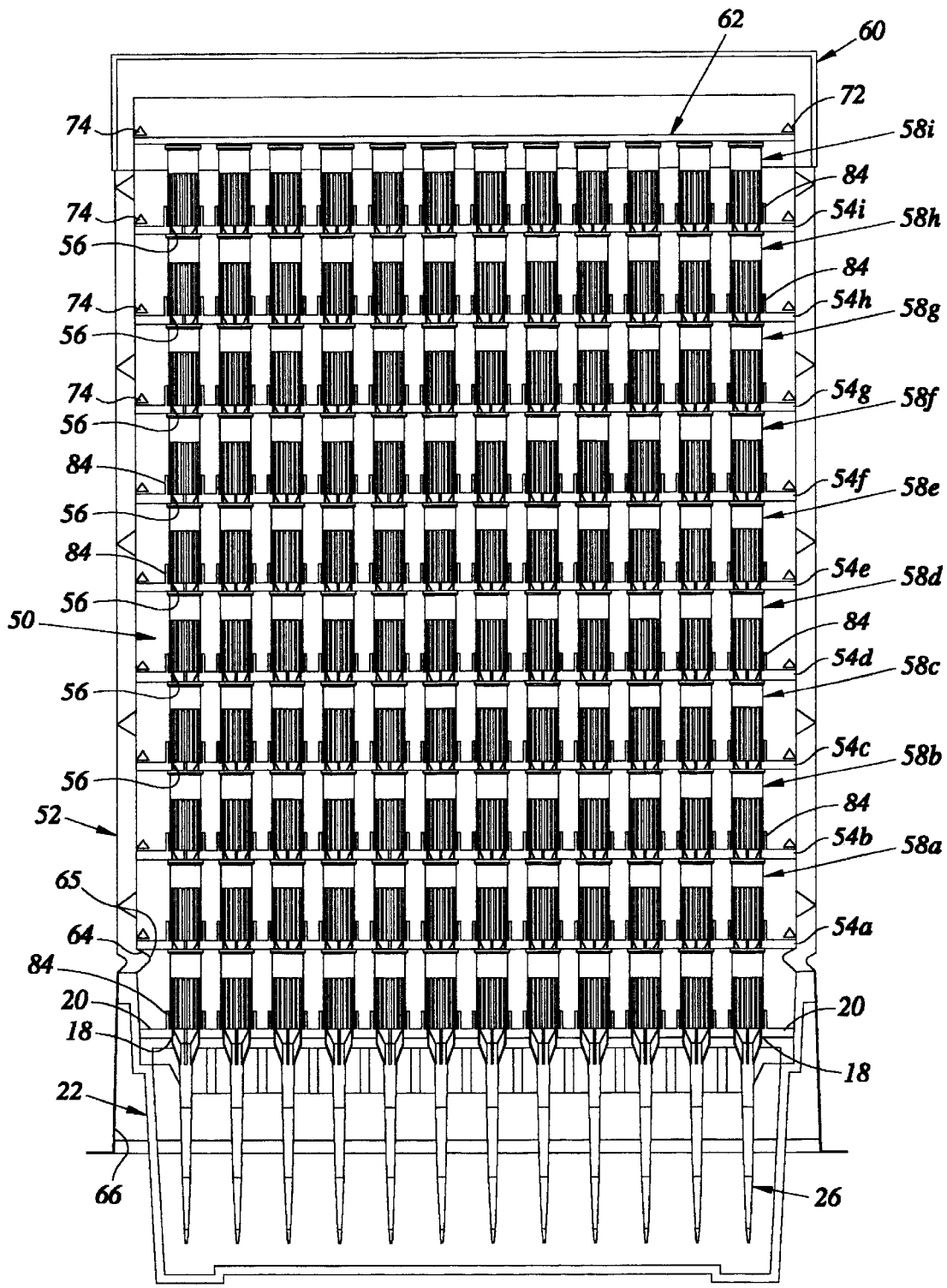
FIG. 3 is a partial side view of an alternate embodiment of a transparent plastic multiple pipette tip array refill pack showing a plurality of arrays of pipette tips each supported by a separate support plate according to the present invention stacked and contained in a multiple dispenser thin-wall shell positioned on a fully loaded tip rack.

As previously noted, a second preferred embodiment of the present invention comprises a stacked multiple array pipette tip refill pack 50 as shown in FIGS. 3 and 4. Generally speaking, the refill pack 50 comprises a vertical tubular container 52 forming a basic element of a cover for the refill pack 50. As illustrated, the container 52 may be formed of a thin light weight plastic material and houses (1) means for organizing a plurality of arrays of pipette tip support plates (54a–i), each with an identical array of holes 56 (corresponding to the array of holes 18 in the organizing tray 20 of the tip rack 22) and each supporting an array (58a–i) of pipette tips 26, (2) a removable cover 60 and a push plate 62, and (3) a releasable means 64 such as inward opposing projections 65 from opposing inner side walls of the container 52 releasably securing a lowermost one of the support plates across a lower open end or bottom of the container.

In addition, a lower annular portion of the container 52 forms a skirt 66 for positioning and guiding the container over and onto the tip rack 22. As shown in FIG. 3, when the container 52 is positioned over the tip rack 22, the distal end portions 24 of a lowermost array 58a of pipette tips 26 extend into corresponding holes 18 in the organizing tray 20 of the fully loaded tip rack 22. The tip rack 22 is banded to the container 52 by a removable plastic sleeve (not shown) to complete a ready-for-shipment package.

When it is desired to use the pipette tips 26, the band is removed to separate the container 52 from the tip rack 22. The pipette tips 26 are then dispensed from the rack 22 in a conventional manner. When all the pipette tips have been dispensed from the rack, the container 52 is then nested over the now empty tip rack 22. When so positioned, actuation of the releasable means 64 releases the lowermost support plate 54a(corresponding in structure to the previously described support plate 14) containing the array 58a into the tip tray 20 thereby refilling the pipette tip rack 22. Once the rack 22 has dispensed the array 58a onto single or multiple-tip pipettes, the foregoing operation may be repeated to again refill the rack 22 with the next lowermost array 58b of pipette tips 26, and so on. In the dispensing of pipette tips from the tip rack 22, structural support for the support plates 54 is provided by the tip rack 22. For that reason, the support plates may be formed of a thin light weight semi-rigid plastic material which upon disposal represents a minimum of non-biodegradable waste.

More particularly as shown in FIG. 3, each of the plurality of horizontally oriented support plates 54a–i, has an array of holes 56 corresponding to the array of holes 18 in the organizing tray 20 of the tip rack 22. Each hole 56 receives a distal end portion 24 of a disposable pipette tip 26 which extends vertically downward therethrough with the proximal end portion 28 of the tip extending vertically upward therefrom. Thus, the support plates 54a–i position the arrays 58a–i of pipette tips 26 with the longitudinal axis of each pipette tip 26 having a vertical orientation.

As illustrated, the plurality of carrier plates 54a–i are stacked in the container 52 with the distal end portions 24 of pipette tips 26 of the array 58i in the uppermost support plate 54i extending within the proximal end portions of pipette tips 26 of the array 58h supported by the next lower support plate 54h and so on down to the lowermost support plate. In such a nesting arrangement for the pipette tips, the upper support plate 54i rests on top of the proximal end portions of pipette tips 26 of the array 58h in the support plate 54h while the support plate 54h rests on top of the proximal end portions of the pipette tips 26 of the array 58g in the support plate 54g and so on down to the lowermost support plate. Thus arranged, the lowermost carrier plate 54a is positioned against the releasable means 64 for releasably restraining the support plate 54a relative to the container 52.

As previously indicated, the container 52 includes the removable cover 60 and the push plate 62. The cover 60 encloses an open upper end of the container 52 and when removed from the container may be used to cover the open upper end of the tip rack 22. The push plate 62 resides in the container 52 at the upper open end thereof and rests on the proximal end portions 28 of the pipette tips 26 in the array 58i. When external downward force is applied to the push plate 62, it moves downward pressing against the uppermost array 58i of pipette tips 26 to transmit the force through the arrays 58a–h to the lowermost array 58a. Each support plate 54a–i sequentially moves downward, becoming the lowermost support plate and is ejected by action of the indexed downward movement of the push plate 62 against the proximal end portions of the array 58i of pipette tips.

In the refill pack 50, the releasable means 64 is part of the four sided tubular container 52. As shown, the container 52 is dimensioned (i) to receive, support and transport the horizontal support plates 54a–i, each sequentially into position as the lowermost support plate at a lower open end of the container 52 and (ii) to receive the push plate 62 at the upper open end of the container after the removal of the cover 60. Opposing sides 52a,b of the tubular container 52 are essentially rectangular, parallel, vertically oriented and mutually attached at contiguous edges thereby enclosing an essentially rectangular volume. The sides 52a,b include vertically positioned and horizontally extending inward projections 65 for releasably supporting opposing marginal edges of the lowermost support plate 54a within the lower opening of the container 52. Thus positioned, the lowermost support plate 54a places the distal end portions of the lowermost array 58a of pipette tips 26 for protection within the lower end of the container 52.

As shown in FIG. 4, additional inward projections in corners of the sides 52a,b of the container 52, comprise horizontally separated series of triangular shaped ramp-like projections 74 spaced at equal intervals vertically above the lowermost support plate 54a so as to permit incremental downward movement of the push plate 62 and prevent an upward return movement thereof. As also shown in FIG. 4, the inward projections 74 are positioned to constrain only the movement of the push plate 62 by contact with the corners thereof. As illustrated, bevelled corners of the support plates 54a–i do not permit the inward projections 74 to contact the peripheral edges of support plates. The incremental downward movement of the push plate 62 thereby affects sequential releasing of the lowermost array of pipette tips 26 contained in the lowermost support plate to drop with the lowermost support plate into the tip rack 22 and a positioning of the next lowermost support plate 54b for subsequent release from the container 52. As described, release of the lowermost support plate results from the downward pressure of the push plate 62 applied against the proximal end portions of the uppermost array 58i of pipette tips 26 and thereby against the support plate 54i and thereafter through the arrays 58a–h of pipette tips and support plates 54b–h. The downward pressure of the lowermost support plate against the projections 65 causes sides 52a,b to flex outward slightly, for releasing the lowermost support plate into the tip rack below.

As shown in FIG. 3, the sides of the container 52 also form a skirt at the lower open end of the container for positioning, centering and guiding the refill pack 50 over the tip rack 22. The positioning provided by the skirt is such that the distal end portions of the lowermost array of pipette tips 26 contained in the lowermost support plate extend downward therefrom and are positioned for dispensing into the tip rack 22.

Figure 5:
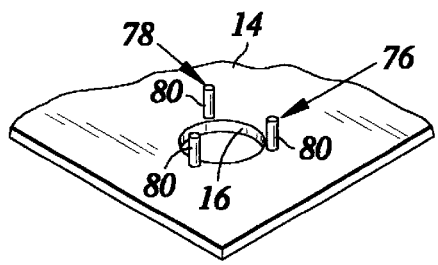
FIGS. 5–9 are enlarged fragmentary perspective views of corner portions of alternate versions of the support plate of the present invention showing different lateral support means according to the present invention.
Figure 6:
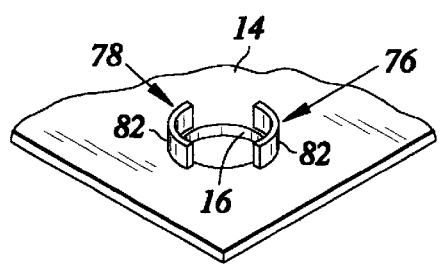
Figure 7:
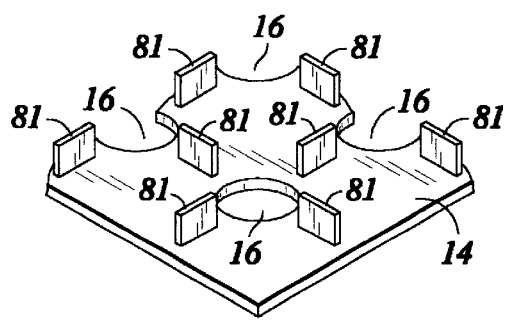
Figure 8:
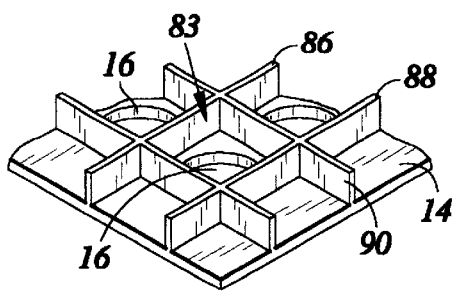

In order to provide the desired lateral stability for "micro" pipette tips as well as other top heavy and large taper angle pipette tips in the refill packs 10 and 50 of the present invention in the pipette tip rack 22 after it has been refilled with such pipette tips, the present invention provides improved pipette tip support plates 14 and 54a–i specially designed to receive and laterally support "micro" and other top heavy and large taper angle pipette tips. The improved support plates are useful in refill packs such as 10 and 50 as well as tip racks such as 22 and, as illustrated in FIGS. 2, 5 and 6, each comprise a plate of rigid or semi-rigid plastic material having an array of holes such as 16 therein for receiving the distal end portions 24 of a plurality of micro or other small pipette tips such as 16. Adjacent each pipette tip receiving hole 16 in the improved tip support plate is lateral support means 76 for the tip confined it the associated support hole. Each such lateral support means 76 comprises one or more vertically extending lateral support surfaces 78 adjacent the associated tip support hole. The lateral support surfaces 78 are shaped and dimensioned to engage a side of the tip supported in the associated hole should the tip rock laterally in the hole thereby maintaining the vertical alignment of the tip in the hole. The surfaces 78 may take various forms including a plurality of rod-shaped posts 80 (FIG. 5), or rectangular posts 81 (FIG. 7) or arcuate collar sections 82 (FIG. 6) extending vertically from the plate and spaced circumferentially around each tip receiving hole in the improved support plate. Alternatively, the support surfaces 78 may comprise vertically extending enclosures 83 around each such hole such as a rectilinear grid 86 of vertically extending cross members 88 and 90 (FIG. 8) or preferably, as illustrated in FIG. 1, a vertically extending collar 84 surrounding each hole. As illustrated in FIGS. 2A–2C and FIG. 3, the collars 84 are dimensioned to receive and provide lateral support for the vertically extending proximal end portion of each micro or other top heavy or large taper angle pipette tip supported by the support plate 14.

Figure 9:
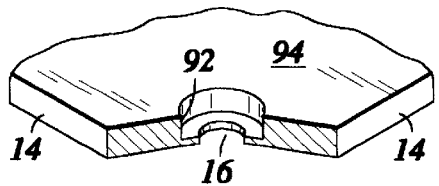

Also, as illustrated in FIG. 9, the lateral support surface 78 may be provided by a annular shoulder formed by a stepped side wall 92 of each pipette tip receiving hole 16 adjacent a top surface 94 of the plate 14.

With the use of such new support plates, the improved refill packs 10 and 50 of the present invention maintain micro and other top heavy and large taper angle pipette tips 16 in vertical alignment laterally spaced from each other for efficient dispensing into empty pipette tip racks such as 22. Further, since the support plates are dispensed with the arrays of pipette tips from the open bottom of the improved refill packs of the present invention, the improved support plate continues to provide the desired lateral support for micro and other top heavy and large taper angle pipette tips in the refilled pipette tip rack 22.

While particular embodiments have been illustrated and described in detail therein, it is appreciated that changes may be made in the particular embodiments without departing from the spirit of the present invention. Therefore, the present invention is to be limited in scope only by the terms of the following claims.

What is claimed:

1. An improved pipette tip support plate and organizing apparatus for use in pipette tip racks and refill packs for such racks, comprising:

a plurality of pipette tips each having a relatively narrow and tapered distal end portion and a relatively large proximal end portion;

a light weight pipette tip support plate having an array of holes extending there through, each hole being dimensioned to just receive the relatively narrow and tapered distal end portion of one of the plurality of pipette tips with the relatively large proximal end portion of the tip extending vertically from the support plate on a side opposite the distal end whereby the support plate laterally organizes and freely supports the plurality of tips for selective and free removal from the plate; and pipette tip lateral support means extending vertically from the pipette tip support plate with lateral support surfaces spaced from the holes in the support plate and from the proximal end portions of the pipette tips in the holes and shaped and dimensioned to only engage sides of the proximal end portions of the pipette tips upon a lateral rocking of such tips in such holes to maintain vertical alignment of the tips on the support plate.

2. The support plate of claim 1 wherein the lateral support means extends vertically from a top of the plate.

3. The support plate of claim 1 wherein the lateral support means comprises vertical projections from the plate.

4. The support plate of claim 3 wherein the vertical projections comprise collars around the at least some of the holes in the plate.

5. The support plate of claim 3 wherein the vertical projections comprise posts spaced circumferentially around the at least some of the holes in the plate.

6. The support plate of claim 3 wherein the vertical projections comprise arcuate collar sections spaced circumferentially around the at least some of the holes in the plate.

7. The support plate of claim 3 wherein the vertical projections comprise vertically extending enclosures around the at least some of the holes in the support plate.

8. The support plate of claim 7 wherein the enclosures comprise rectilinear grids of vertically extending cross members.

9. The support plate of claim 1 wherein the lateral support means comprises an annular shoulder formed by a stepped side wall in the at least some of the holes in the support plate.

* * * * *